(12) United States Patent
Murayama et al.

(10) Patent No.: US 8,346,083 B2
(45) Date of Patent: Jan. 1, 2013

(54) BANDWIDTH ALLOCATION METHOD AND PASSIVE OPTICAL NETWORK SYSTEM

(75) Inventors: Daisuke Murayama, Mukuhari (JP); Noriyuki Oota, Makuhari (JP); Noriki Miki, Makuhari (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 345 days.

(21) Appl. No.: 12/866,356

(22) PCT Filed: Feb. 17, 2009

(86) PCT No.: PCT/JP2009/052698
§ 371 (c)(1),
(2), (4) Date: Aug. 5, 2010

(87) PCT Pub. No.: WO2009/107519
PCT Pub. Date: Sep. 3, 2009

(65) Prior Publication Data
US 2010/0322634 A1    Dec. 23, 2010

(30) Foreign Application Priority Data
Feb. 26, 2008 (JP) ................................. 2008-044948

(51) Int. Cl.
*H04J 14/00* (2006.01)
(52) U.S. Cl. ............... 398/72; 398/69; 398/68; 398/98; 398/100; 370/468; 370/235; 370/229; 370/395.41
(58) Field of Classification Search .................... 398/66, 398/67, 68, 69, 70, 71, 72, 98, 99, 100, 58, 398/73, 74, 75, 76, 77, 78, 79, 59, 63; 370/468, 370/229, 389, 352, 392, 235, 465, 477, 395.41, 370/395.21, 236, 401, 230, 395.4
See application file for complete search history.

(56) References Cited

U.S. PATENT DOCUMENTS
7,653,084 B2 * 1/2010 Shin et al. ..................... 370/468
(Continued)

FOREIGN PATENT DOCUMENTS
EP         1 292 054 A2    3/2003
(Continued)

OTHER PUBLICATIONS

McGarry, et al., "Ethernet PONs: A Survey of Dynamic Bandwidth Allocation (DBA) Algorithms", vol. 42, No. 8, Aug. 1, 2004, pp. S8-S15.

(Continued)

*Primary Examiner* — Hanh Phan
(74) *Attorney, Agent, or Firm* — Ohlandt, Greeley, Ruggiero and Perle, L.L.P.

(57) ABSTRACT

An optical line terminal calculates a requirement threshold for each optical subscriber unit based on a difference between the time average allocated bandwidth of each optical subscriber unit and the target bandwidth, and notifies a corresponding optical subscriber unit of the calculated requirement threshold. The corresponding optical subscriber unit then notifies, based on the data amount accumulated in a buffer, the optical line terminal of a data amount, as a transmission requirement, up to a data separation that is less or equal to the notified requirement threshold and in which a maximum transmission amount can be transmitted. The optical line terminal then notifies the corresponding optical subscriber unit of a transmission permission amount in which the data equal to the transmission requirement of which the optical line terminal is notified can be transmitted. The corresponding optical subscriber unit then transmits the data amount corresponding to the transmission permission amount.

28 Claims, 5 Drawing Sheets

U.S. PATENT DOCUMENTS

| | | | |
|---|---|---|---|
| 7,889,990 B2 * | 2/2011 | Kazawa et al. | 398/72 |
| 2007/0019957 A1 | 1/2007 | Kim et al. | 398/72 |
| 2007/0071031 A1 | 3/2007 | Shin et al. | 370/468 |

FOREIGN PATENT DOCUMENTS

| | | |
|---|---|---|
| JP | 2004-129172 A | 4/2004 |
| JP | 2004-528740 A | 9/2004 |
| JP | 2006-005764 A | 1/2006 |

OTHER PUBLICATIONS

Extended Search Report dated May 18, 2011 for corresponding European Patent Application No. 09714582.5.

International Search Report dated Mar. 17, 2009 for corresponding International Application No. PCT/JP2009/052698.

English translation of Written Opinion of International Searching Authority for corresponding International Patent Application No. PCT/JP2009/052698 (non-English Written Opinion of International Searching Authority previously submitted on Aug. 5, 2010).

English translation of International Preliminary Report on Patentability for corresponding International Patent Application No. PCT/JP2009/052698, 2010.

* cited by examiner

BANDWIDTH ALLOCATION METHOD AND PASSIVE OPTICAL NETWORK SYSTEM

BACKGROUND

1. Field of the Disclosure

The present disclosure relates to a bandwidth allocation method for dynamically allocating an upstream communication time (bandwidth) in a passive optical network and a passive optical network system in which the bandwidth allocation method is adopted.

2. Discussion of the Background Art

Recently users of FTTH (Fiber To The Home) services are increasing with development of the Internet. A PON (Passive Optical Network) including an OLT (Optical Line Terminal) placed in a central office of a communication carrier and an ONU (Optical Network Unit) placed in a user's home is one of modes of FTTH.

The PON is an optical network in which the OLT and the plural ONUs are connected through an optical transmission line such as an optical fiber and a passive optical splitter, and the PON is widely used because of its economical superiority.

In an EPON (Ethernet (a registered trademark) PON) in which the OLT and the ONU conduct communication through an Ethernet (a registered trademark) frame, because a GE-PON (Gigabit Ethernet (a registered trademark) PON) having a transmission speed of 1 Gbps can provide the high-rate, and inexpensive FTTH service, in particular the GE-PON is widely used within the country. Recently there is a studied of 10 G-EPON whose transmission speed is enhanced to 10 Gbps.

Generally, in the PON, a communication direction from the OLT to the ONU is called a downstream direction, and the opposite direction to the downstream direction is called an upstream direction. In many PONs including the GE-PON, the communication in the upstream direction is performed by time-division multiple access. The OLT controls transmission timing of each ONU, which allows the plural ONUs to conduct communication with the OLT in the time-division manner.

Similarly the upstream communication of the 10 G-EPON is conducted by the time-division multiple access. In the 10 G-EPON, there is a studied method in which the plural ONUs having the different upstream transmission speeds can be connected to one OLT. At this point, the upstream communication is realized by the time-division multiple access even between the OLT and the ONUs having the different upstream transmission speeds.

In many PONs in which the communication in the upstream direction is conducted by the time-division multiple access, in order to efficiently utilize the upstream bandwidth, dynamically allocated bandwidth is required by dynamically changing a time length in which the upstream communication of each ONU is permitted according to a communication state. In this case, a transmission permission amount is calculated in each ONU, and its transmission time band is exclusively secured, thereby allocating the bandwidth.

In the GE-PON, a protocol called MPCP (Multi Point-Control Protocol) is defined in order to control transmission timing of each of the plural ONUs. The OLT performs the dynamic allocated bandwidth using the MPCP.

The ONU transmits a transmission request signal to the OLT while a transmission waiting upstream data amount is described as a transmission waiting amount in the transmission request signal. The OLT receives the transmission request signal, refers to a transmission requirement, calculates a transmission permission amount and a transmission starting time in each ONU, and transmits a transmission permission signal to each ONU while the transmission permission amount and the transmission starting time are described in the transmission permission signal. At this point, the OLT performs control such that the ONU transmission signals do not temporally overlap one another. The ONU follows the received transmission permission signal to start the transmission from the specified transmission starting time, and transmits the signal accumulated in an upstream buffer only for the time of the specified transmission permission amount.

The dynamic bandwidth allocation method is important in determining performance of the PON system. The performance of the PON system can be evaluated using indexes such as bandwidth utilization efficiency and a speed of the convergence of the actual allocated bandwidth on the target bandwidth. In the dynamic allocated bandwidth, it is necessary that the target bandwidth be calculated from the communication state of each ONU while the high bandwidth utilization efficiency is maintained, and that the actual allocated bandwidth be brought close to the target bandwidth. At this point, the speed of the convergence of the actual upstream allocated bandwidth on the target bandwidth is largely influenced by the dynamic bandwidth allocation method.

It can be said that it is a high performance PON system that the average allocation bandwidth of actual time converges faster to the target bandwidth.

Therefore, in one of the dynamic bandwidth allocation methods, the OLT provides a requirement threshold that is of a transmission requirement threshold to the ONU, causes the ONU to report a buffer accumulation amount that is equal to or lower than the threshold as a transmission requirement to the OLT, and notifies the ONU of the transmission permission amount matched with the transmission requirement that is less than equal to the threshold reported from the ONU.

Japanese Unexamined Patent Application Publication No. 2004-528740 discloses a method for controlling the upstream allocated bandwidth by providing an upper limit in the upstream transmission requirement of each ONU. In Japanese Unexamined Patent Application Publication No. 2004-528740, each ONU notifies the OLT of the transmission requirement, and the OLT permits the transmission of the amount that is matched with the notified transmission requirement, so that a surplus bandwidth is eliminated and the bandwidth utilization efficiency is improved. At this point, the upper limit is set to the transmission requirement of each ONU in order to prevent the state in which the bandwidth is exclusively allocated to the ONU having the traffic amount larger than other ONUs and to realize SLA (Service Level Agreement). The allocated bandwidth can be controlled by setting the upper limit.

However, in the conventional method, there are problems that the upper limit of the transmission requirement is not suitable to the quick convergence of the allocated bandwidth on the target bandwidth, and the convergence of the allocated bandwidth on the target bandwidth cannot be controlled.

That is, in Japanese Unexamined Patent Application Publication No. 2004-528740, the allocated bandwidth is controlled by setting the upper limit of the transmission requirement in order to avoid the bandwidth monopolization of the particular ONU and to realize the SLA. Therefore, because the upper limit of the transmission requirement is fixed to a value that is not suitable to the control of the allocated bandwidth, not only the allocated bandwidth cannot converge quickly on the target bandwidth, but also the way of the convergence cannot be controlled. In Japanese Unexamined Patent Application Publication No. 2004-528740, in addition to the above-described method, there is also proposed a method in which the upper limit of the transmission requirement is dynamically adjusted based on an input traffic to the ONU from a connected terminal or the like. However, there is disclosed no specific procedure of adjusting the upper limit of the transmission requirement.

An object of the disclosure is to provide a bandwidth allocation method in which, when the PON upstream bandwidth is dynamically allocated, the way of convergence can be controlled while the time average allocated bandwidth converges quickly on the target bandwidth, and a passive optical network system in which the bandwidth allocation method is adopted.

SUMMARY

In order to achieve the above object, a bandwidth allocation method according to the present disclosure dynamically allocates a communication bandwidth from each of a plurality of optical subscriber units to an optical line terminal in a passive optical network in which the optical line terminal and the plurality of optical subscriber units are connected through an optical transmission line, the bandwidth allocation method includes: a step in which the optical line terminal obtains a time average allocated bandwidth from allocated bandwidths of past predetermined number of cycles for each of the optical subscriber units, calculates a requirement threshold for each of the optical subscriber units based on a difference between the time average allocated bandwidth for each of the optical subscriber units and a target bandwidth determined for each of the optical subscriber units, and notifies a corresponding optical subscriber unit of the requirement threshold; a step in which the corresponding optical subscriber unit notifies the optical line terminal of a data amount, corresponding to data amount including data sections up to a section which makes a transmission amount maximum in a range equal or less than the notified requirement threshold as a transmission requirement; a step in which the optical line terminal notifies the corresponding optical subscriber unit of a transmission permission amount in order to permit transmission of a data amount corresponding to the notified transmission requirement; and a step in which the corresponding optical subscriber unit transmits the data amount corresponding to the transmission permission amount.

In the bandwidth allocation method according to the present disclosure, it is preferable that a sum of a proportional calculation result of the difference, a time integration calculation result of the difference, and a time derivation calculation result of the difference is set to a PID computation amount, a threshold control amount is calculated based on the PID computation amount, and the requirement threshold of the corresponding optical subscriber unit is calculated based on the threshold control amount.

In the bandwidth allocation method according to the present disclosure, it is preferable that the threshold control amount is set to zero for the negative PID computation amount.

In the bandwidth allocation method according to the present disclosure, it is preferable that a predetermined value is added to the PID computation amount to calculate the threshold control amount.

In the bandwidth allocation method according the present disclosure, it is preferable that a minimum value of the PID computation amount is set to a minimum PID computation amount in the plurality of optical subscriber units, a difference between the PID computation amount of the corresponding optical subscriber unit and the minimum PID computation amount is calculated as a PID difference, a total of the PID differences for the plurality of optical subscriber units is calculated as a PID difference total, a value obtained by the PID difference of the corresponding optical subscriber unit divided by the PID difference total is calculated as a PID difference ratio, and the threshold control amount is calculated based on the PID difference ratio.

In the bandwidth allocation method according to the present disclosure, it is preferable that the requirement threshold is calculated as a value identical to the threshold control amount.

In the bandwidth allocation method according to the present disclosure, it is preferable that a predetermined minimum allocation amount is added to the threshold control amount to calculate the requirement threshold.

In order to achieve the above object, a passive optical network according to the present disclosure system is characterized in that an optical line terminal and a plurality of optical subscriber units are connected through an optical transmission line to dynamically allocate a communication bandwidth from each of the plurality of optical subscriber units to the optical line terminal, wherein the optical line terminal obtains a time average allocated bandwidth from allocated bandwidths of past predetermined cycles for each of the optical subscriber units, calculates a requirement threshold in each of the optical subscriber units based on a difference between the time average allocated bandwidth for each of the optical subscriber units and a target bandwidth determined for each of the optical subscriber units, and notifies a corresponding optical subscriber unit of the calculated requirement threshold; the corresponding optical subscriber unit notifies the optical line terminal of a data amount corresponding to data amount including data sections up to a section which makes a transmission amount maximum in a range equal or less than the notified requirement threshold as a transmission requirement; the optical line terminal notifies the corresponding optical subscriber unit of a transmission permission amount in order to permit transmission of a data amount corresponding to the notified transmission requirement ; and the corresponding optical subscriber unit transmits the data amount corresponding to the transmission permission amount.

In order to achieve the above object, a bandwidth allocation method according to the present disclosure dynamically allocates a communication bandwidth from each of a plurality of optical subscriber units to an optical line terminal in a passive optical network in which the optical line terminal and the plurality of optical subscriber units are connected through an optical transmission line, the bandwidth allocation method includes: a step in which each of the optical subscriber units obtains a time average allocated bandwidth from allocated bandwidths to the optical subscriber unit for past predetermined number of cycles, calculates a requirement threshold for the optical subscriber unit based on a difference between the time average allocated bandwidth and a target bandwidth determined in the optical subscriber units, and notifies the optical line terminal of a data amount corresponding to data amount including data sections up to a section which makes a transmission amount maximum in a range equal or less than the calculated requirement threshold as a transmission requirement; a step in which the optical line terminal notifies the corresponding optical subscriber unit of a transmission permission amount in order to permit transmission of a data amount corresponding to the notified transmission requirement; and a step in which the corresponding optical subscriber unit transmits the data amount corresponding to the transmission permission amount to the optical line terminal.

In the bandwidth allocation method according to the present disclosure, it is preferable that the optical line terminal calculates a target bandwidth for each of the optical subscriber units according to communication states of all the optical subscriber units connected to the optical line terminal, and notifies each of the optical subscriber units of the target bandwidth.

In the bandwidth allocation method according to the present disclosure, it is preferable that a sum of a proportional calculation result of the difference, a time integration calculation result of the difference, and a time derivation calculation result of the difference is set to a PID computation amount, a threshold control amount is calculated based on the PID computation amount, and the requirement threshold of the corresponding optical subscriber unit is calculated based on the threshold control amount.

In the bandwidth allocation method according to the present disclosure, it is preferable that the threshold control amount is set to zero for the negative PID computation amount.

In the bandwidth allocation method according to the present disclosure, it is preferable that a predetermined value is added to the PID computation amount to calculate the threshold control amount.

In the bandwidth allocation method according to the present disclosure, it is preferable that the requirement threshold is calculated as a value identical to the threshold control amount.

In the bandwidth allocation method according to the present disclosure, it is preferable that a predetermined minimum allocation amount is added to the threshold control amount to calculate the requirement threshold.

In order to achieve the above object, a passive optical network system according to the present disclosure is characterized in that an optical line terminal and a plurality of optical subscriber units are connected through an optical transmission line to dynamically allocate a communication bandwidth from each of the plurality of optical subscriber units to the optical line terminal, wherein each of the optical subscriber units obtains a time average allocated bandwidth from allocated bandwidths of past predetermined number of cycles for each of the optical subscriber units, and calculates a requirement threshold for each of the optical subscriber units based on a difference between the time average allocated bandwidth and a target bandwidth determined for each of the optical subscriber units; the corresponding optical subscriber unit notifies the optical line terminal of a data amount, corresponding to data amount including data sections up to a section which makes a transmission amount maximum in a range equal or less than the calculated requirement threshold as a transmission requirement; the optical line terminal notifies the corresponding optical subscriber unit of a transmission permission amount in order to permit transmission of a data amount corresponding to the notified transmission requirement; and the corresponding optical subscriber unit transmits the data amount corresponding to the transmission permission amount.

In the bandwidth allocation method according to the present disclosure, it is preferable that the requirement threshold is updated based on a set period.

According to the present disclosure, when the PON upstream bandwidth is dynamically allocated, at the same time as the mismatch between the transmission requirement and the transmission permission amount is minimized, the requirement threshold is serially updated to a requirement threshold suitable to the convergence on the target bandwidth while the OLT monitors the temporal change of the transmission permission amount to each ONU, and the time average allocated bandwidth can converge quickly on the target bandwidth. The way of convergence can be controlled by adjusting the parameter for computing the requirement threshold.

DETAILED DESCRIPTION OF THE PREFERRED EMBODIMENT

Explanations of Letters or Numerals
$R_i$ to $R_n$: Report frame
$G_i$ to $G_n$: Gate frame
$z_i$: Requirement threshold
$a_i$: Transmission requirement
$b_i$: Transmission permitted data amount
$c_i$: Transmission waiting amount
$d_i$: Transmission permission amount
$F_i$: Data
(First Embodiment)

A method in which an OLT calculates a requirement threshold based on a time average allocated bandwidth obtained from allocated bandwidths of past predetermined cycles of ONU will be described below. For a constant data transmission bit rate, the following amount, bandwidth, and the like may be processed by a data amount or a time. An i-th ONU is expressed by $ONU_i$, and hereinafter a suffix i is added to a parameter of the $ONU_i$. A difference $e_i$ between the time average allocated bandwidth of the $ONU_i$ and a target bandwidth obtained from a communication state of each ONU is calculated. A PID (Proportional Integral Derivative) computation amount $x_i$ is calculated from the following equation:

[Equation 1]

$$x_i = P_i\left(e_i + I_i \int e_i dt + D_i \frac{de_i}{dt}\right) \quad (1)$$

where $P_i$, $I_i$, and $D_i$ are predetermined parameters. The OLT can control the way of the convergence of the allocated bandwidth on the target bandwidth by adjusting values of $P_i$, and $D_i$ (for example, an optimum value is obtained by the actual measurement etc.).

Three methods for computing a threshold control amount $y_i$ based on the PID computation amount $x_i$ will be described below. A first method is a method for computing a positive value of the PID computation amount $x_i$ as the threshold control amount $y_i$, and the PID computation amount $x_i$ is calculated by the following equation:

[Equation 2]

$$y_i = \begin{cases} x_i & \dots (x_i > 0) \\ 0 & \dots (x_i \le 0) \end{cases} \quad (2)$$

Therefore, the threshold control amount $y_i$ can be set to zero for the negative PID computation amount $x_i$, and the PID computation amount $x_i$ can be used as the threshold control amount $y_i$ as it is for the positive PID computation amount $x_i$.

The threshold control amount $y_i$ is calculated by the first method, which allows enhancement of a calculation processing speed.

A second method for computing the threshold control amount $y_i$ is a method for adding a predetermined value $B_i$ to the PID computation amount $x_i$, and the threshold control amount $y_i$ is calculated by the following equation:

[Equation 3]

$$y_i = \begin{cases} x_i + B_i & \dots (x_i > -B_i) \\ 0 & \dots (x_i \le -B_i) \end{cases} \quad (3)$$

Therefore, a value range of the threshold control amount $y_i$ can spread to obtain control performance higher than that of the first method.

For example, the predetermined value $B_i$ is determined such that the time average allocated bandwidth converges on the target bandwidth, which allows the enhancement of a speed of the convergence on the target bandwidth.

A third method for computing the threshold control amount $y_i$ is performed as follows. That is, the PID computation amount of the ONU having the minimum PID computation amount x in all the ONUs is set to a minimum PID computation amount $x_{min}$, a difference "$x_i - x_{min}$" between the PID computation amount $x_i$ of the $ONU_i$ and the minimum PID computation amount $x_{min}$ is calculated as a PID difference, a value in which the PID difference "$x_i - x_{min}$" of the $ONU_i$ is divided by the sum of PID differences of all the ONUs is calculated as a PID difference ratio, and a product of the PID difference ratio and T, which is the number of data bytes pre one allocation cycle is set to the threshold control amount $y_i$, and the threshold control amount $y_i$ is calculated by the following equation:

[Equation 4]

$$y_i = \frac{x_i - x_{min}}{\sum (x_i - x_{min})} \times T \quad (4)$$

Therefore, the number of ONUs whose threshold control amounts $y_i$ become zero can be suppressed up to one, and a maximum delay time can be effectively shortened.

Two methods for computing the requirement threshold z by the obtained threshold control amount $y_i$ will be described below. A first method for obtaining the requirement threshold z is a method for equalizing the requirement threshold $z_i$ to the threshold control amount $y_i$. A second method for obtaining the requirement threshold z is a method for computing the requirement threshold $z_i$ by adding predetermined minimum guaranteed allocation amount $A_i$ to the threshold control amount $y_i$, and the requirement threshold $z_i$ is obtained by the following equation:

[Equation 5]

$$z_i = y_i + A_i \quad (5)$$

Therefore, the number of ONUs whose threshold control amounts $y_i$ become zero can be suppressed up to zero, and the maximum delay time can be effectively shortened.

For example, the minimum guaranteed allocation amount $A_i$ is determined by a data amount that is guaranteed in each cycle in order to maintain communication service.

Figure 1:
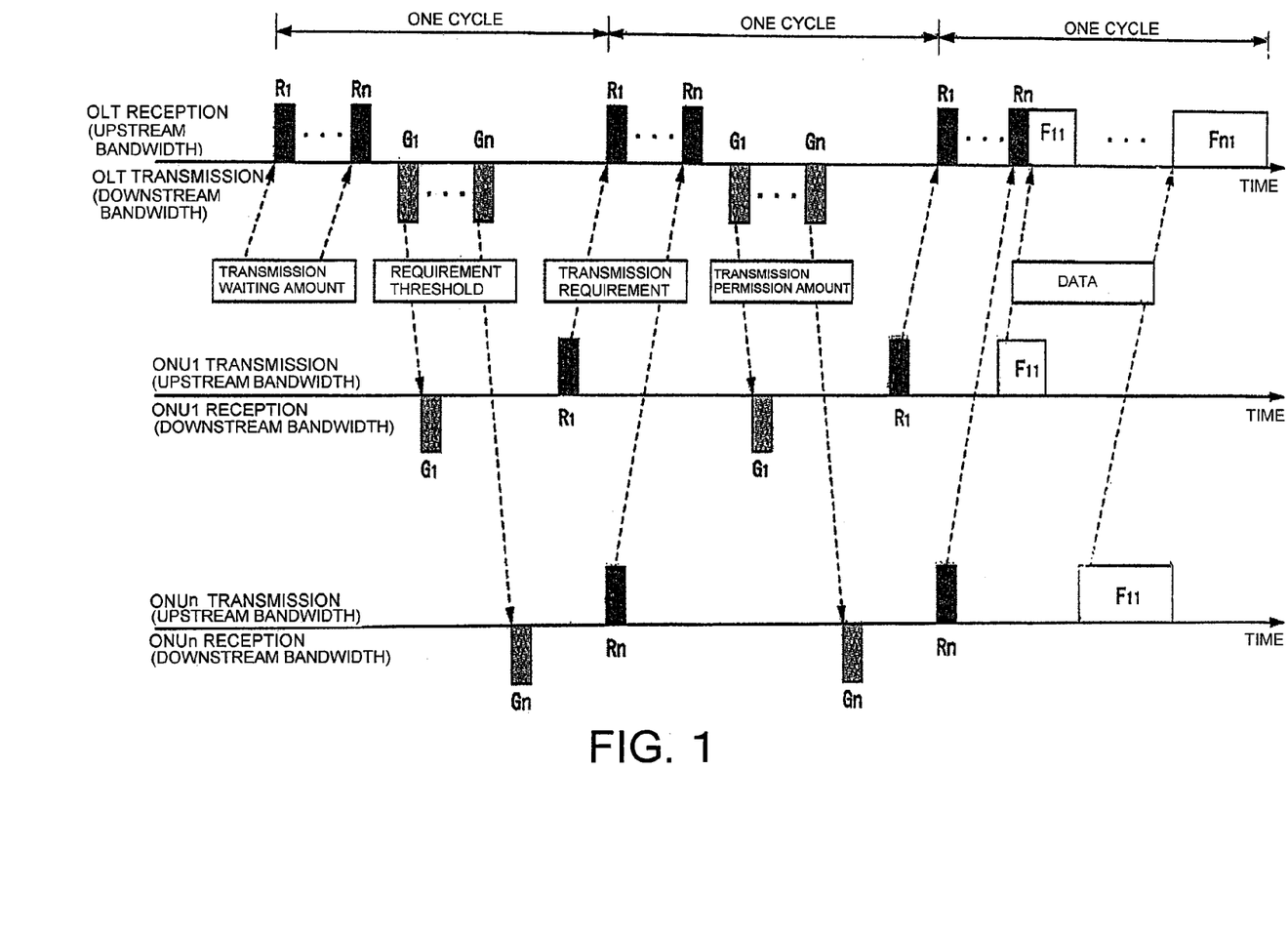
FIG. 1 is an explanatory view of communication conducted between an OLT and each ONU.

The OLT notifies the $ONU_i$ of the obtained requirement threshold $z_i$. FIG. 1 illustrates communication contents conducted between the OLT and the plural ONUs by a gate frame $G_i$ and a report frame $R_i$. At this point, i=1 to n.

The OLT calculates a time average of the bandwidths allocated in the past predetermined cycles as a time average allocated bandwidth with respect to the $ONU_1$ to $ONU_n$, and stores the time average therein.

Each of the $ONU_1$ to $ONU_n$ describes a data amount whose transmission is not permitted in the transmission data amount accumulated in the upstream buffer as an accumulation data amount (transmission waiting amount) in the report frames $R_1$ to $R_n$, and each of the $ONU_1$ to $ONU_n$ notifies the OLT of the data amount at the time each of the $ONU_1$ to $ONU_n$, is notified by the gate frames $G_1$ to $G_n$ from the OLT. The OLT calculates the target bandwidth based on the transmission waiting amount of each of the $ONU_1$ to $ONU_n$. The OLT obtains the PID computation amounts $x_1$ to $x_n$, based on the stored time average allocated bandwidth of each of the $ONU_1$ to $ONU_n$ and the calculated target bandwidth, and then the OLT obtained the threshold control amounts $y_1$ to $y_n$, thereby computing the requirement thresholds $z_1$ to $z_n$. The OLT notifies each of the $ONU_1$ to $ONU_n$ of the requirement thresholds $z_1$ to $z_n$ by the gate frame $G_1$ to $G_n$.

Each of the $ONU_1$ to $ONU_n$ calculates a buffer accumulation amount, which is up to a frame end that is less or equal to the notified requirement threshold $z_1$ to $z_n$ and in which a maximum data amount can be transmitted, as the transmission requirement, and then notifies the OLT by the report frames $R_1$ to $R_n$. The OLT notifies each of the $ONU_1$ to $ONU_n$ of the transmission permission amount that is equal to the transmission requirement of which the OLT is notified. Each of the $ONU_1$ to $ONU_n$ transmits to the OLT the data corresponding to the transmission permission amount of which each of the $ONU_1$ to $ONU_n$ is notified.

Figure 2:
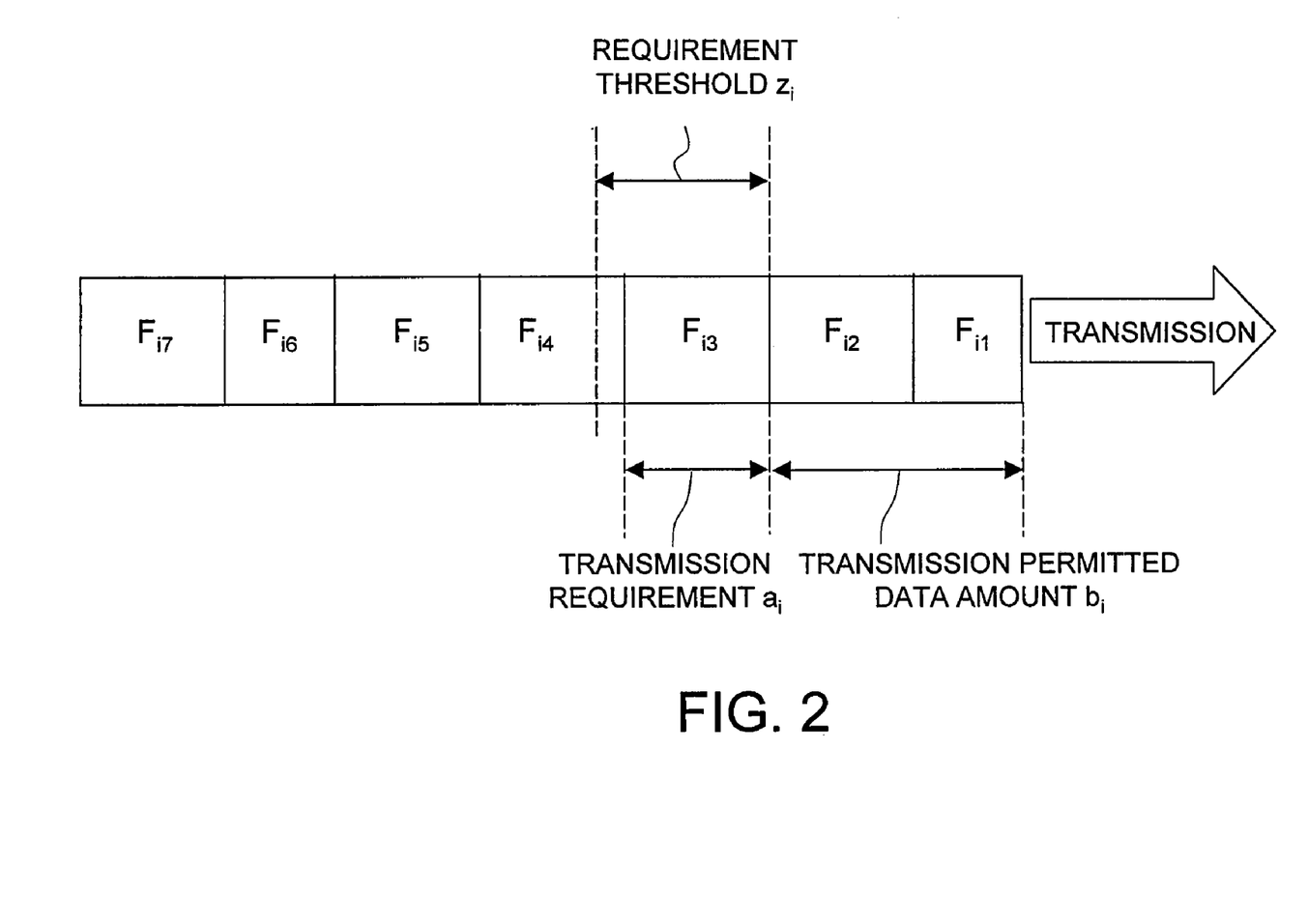
FIG. 2 is an explanatory view illustrating contents of a transmission buffer of the ONU.

FIG. 2 illustrates the requirement threshold $z_i$, a transmission requirement and a transmission permitted data amount $b_i$ in the transmission buffer in which pieces of data $F_{i1}$ to $F_{i7}$ are accumulated with respect to the i-th $ONU_i$. The i-th $ONU_i$ notifies the OLT of the transmission requirement $a_i$ and transmission waiting amount ($F_{i3}$ to $F_{i7}$) in the requirement threshold $z_i$ by the same report frame $R_i$. The OLT determines the transmission permission amount ($=a_i$) that is matched with the transmission requirement $a_i$ from the $ONU_i$ and the transmission timing, and notifies $ONU_i$ of the transmission permission amount and the transmission timing by the gate frame $G_i$. At this point, the OLT notifies $ONU_i$ of the transmission permission amount ($=a_i$) and the next requirement threshold $z_i$ by the same gate frame $G_i$. The $ONU_i$ transmits the upstream data $F_{i3}$ according to the transmission permission amount ($=a_i$) and transmission timing of which the OLT notified.

The transmission permission amount determined by the OLT is not limited to the data amount that is equal to or matched with the transmission requirement $a_i$. For example, preferably the OLT determines the transmission permission amount corresponding to the transmission requirement $a_i$ from the $ONU_i$. At this point, the transmission permission amount corresponding to the transmission requirement $a_i$ includes pieces of information, such as burst overhead and FEC (Forward Error Correction) parity, which are necessary to permit the transmission amount equal to the transmission requirement.

In order that the OLT notifies the $ONU_i$ of the requirement threshold $z_i$, instead of using the gate frame $G_i$, an OAM frame may be utilized. At this point, the gate frame $G_i$ is used to notify the $ONU_i$ of the transmission permission amount ($=a_i$) and the transmission timing as is conventionally done.

In order that the OLT notifies the $ONU_i$ of the requirement threshold $z_i$, a dedicated frame may be newly defined to be utilized for notification. Further, in the 10 G-EPON (Ethernet (a registered trademark) Passive Optical Network), the $ONU_i$ may be notified using an extended MAC control message.

An example of the case in which the transmission requirement $a_i$ does not include the transmission permitted data amount $b_i$ is described above. In this case, preferably the transmission requirement $a_i$ is less or equal to the requirement threshold $z_i$ and the maximum data amount in a data separation in which the data can be transmitted and received while divided. As used herein, the data separation means a frame end of the Ethernet (a registered trademark) frame, a code word end of the FEC, an ATM (Asynchronous Transfer Mode) cell end of a B-PON (Broadband PON), or a GEM (G-PON Encapsulation Method) frame end of a G-PON (Gigabit PON).

Figure 3:
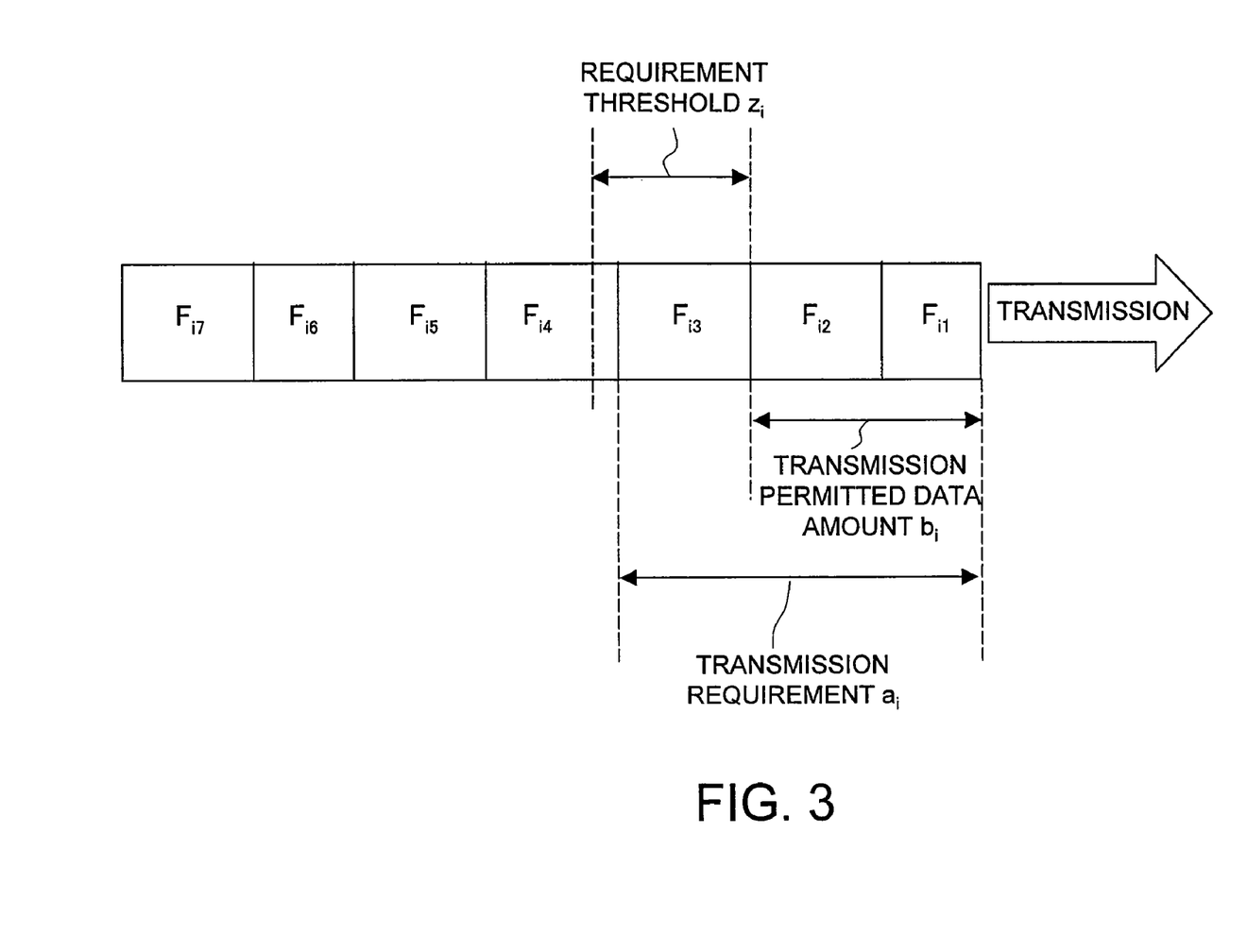
FIG. 3 is an explanatory view illustrating second contents of the transmission buffer of the ONU.

FIG. 3 is an explanatory view illustrating second contents of the transmission buffer of the ONU. In FIG. 2, the transmission requirement $a_i$ does not include the transmission permitted data amount $b_i$. However, transmission requirement $a_i$ may include the transmission permitted data amount $b_i$ as illustrated in FIG. 3. In such cases, the transmission requirement $a_i$ becomes the data amount that is of the data separation less or equal to the sum $(z_i+b_i)$ of the requirement threshold $z_i$ and the transmission permitted data amount $b_i$ in the data separation in which the data can be transmitted and received while divided. The OLT subtracts the transmission permitted data amount $b_i$ from the transmission requirement $a_i$ of which the ONU notified, and recognizes the actual transmission requirement $(a_i-b_i)$.

Figure 4:
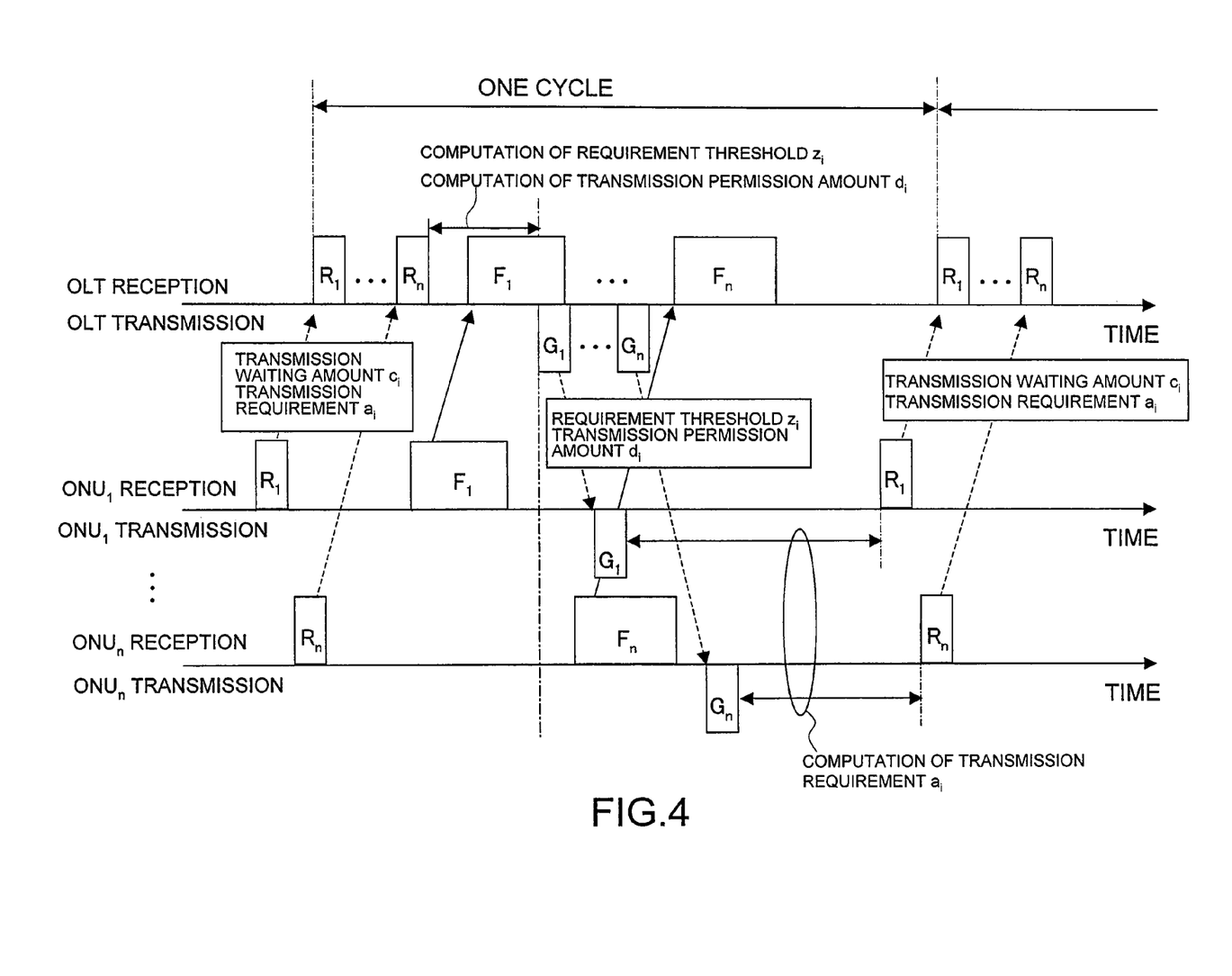
FIG. 4 is a sequence diagram illustrating an example of a bandwidth allocation method according to a first embodiment of the present disclosure.

FIG. 4 is a sequence diagram illustrating an example of a bandwidth allocation method performed by a passive optical network system according to the embodiment of the disclosure. The bandwidth allocation method of the embodiment includes a first step, a second step, a third step, and a fourth step in order, and is characterized in that a communication bandwidth from each of plural optical network units (hereinafter referred to as ONUs) to an optical line terminal (hereinafter referred to as OLT) is dynamically allocated in a passive optical network in which the OLT and the ONUs are connected through an optical transmission line.

First, each of the $ONU_1$ to $ONU_n$ notifies the OLT of a transmission waiting amount $c_i$ in the timing of which the OLT notifies each of the $ONU_1$ to $ONU_n$, by the gate frames $G_1$ to $G_n$.

In the first step, the OLT obtains the time average allocated bandwidth from the allocated bandwidths of the past predetermined cycles of each $ONU_i$, calculates the requirement threshold $z_i$ in each $ONU_i$ based on a difference between the time average allocated bandwidth of each $ONU_i$ and the target bandwidth defined in each $ONU_i$, and notifies a corresponding $ONU_i$ of the calculated requirement threshold $z_i$. The ONU updates the requirement threshold $z_i$ to the value of which the OLT notifies the ONU.

At this point, preferably the ONU updates the requirement threshold $z_i$ to the value of which the OLT notifies the ONU, based on a set period. For example, the period, during which the OLT notifies the ONU of the requirement threshold $z_i$ and the ONU updates requirement threshold $z_i$, is previously set based on a relationship between the update period of the requirement threshold $z_i$ and the bandwidth convergence speed. At this point, the update period of the requirement threshold $z_i$ may be set to a value equal to an allocation period of a transmission permission amount $d_i$ of the ONU, or to a value several hundred times of the allocation period. A load on computation processing per unit time can be reduced as the update period of the requirement threshold $z_i$ is increased with respect to the allocation period.

In the second step, the corresponding $ONU_i$ calculates the data amount, which is up to the data separation that is less or equal to the notified requirement threshold $z_i$ and in which the maximum data amount can be transmitted, as the transmission requirement $a_i$, and the corresponding $ONU_i$ notifies the OLT of the transmission requirement $a_i$.

In the third step, the OLT calculates the transmission permission amount $d_i$ corresponding to the transmission requirement $a_i$ of which the OLT is notified, and notifies the corresponding $ONU_i$ of the transmission permission amount $d_i$.

In the fourth step, the corresponding $ONU_i$ transmits the data $F_i$ having the data amount corresponding to the transmission permission amount $d_i$ to the OLT.

As described above, in the disclosure, when the PON upstream bandwidth is allocated, at the same time as the mismatch between the transmission requirement and the transmission permission amount is minimized, the requirement threshold can serially be updated to a requirement threshold suitable to the convergence on the target bandwidth while the OLT monitors the temporal change of the transmission permission amount to each ONU, and the time average allocated bandwidth can converge quickly on the target bandwidth. The way of convergence can be controlled by adjusting the parameter for computing the requirement threshold.

Therefore, the time average allocated bandwidth can converge quickly on the target bandwidth by adopting the bandwidth allocation method of the first embodiment and the passive optical network system in which the bandwidth allocation method can be performed. Further, the way of convergence can be controlled by adjusting the parameter for computing the requirement threshold.

(Second Embodiment)

Figure 5:
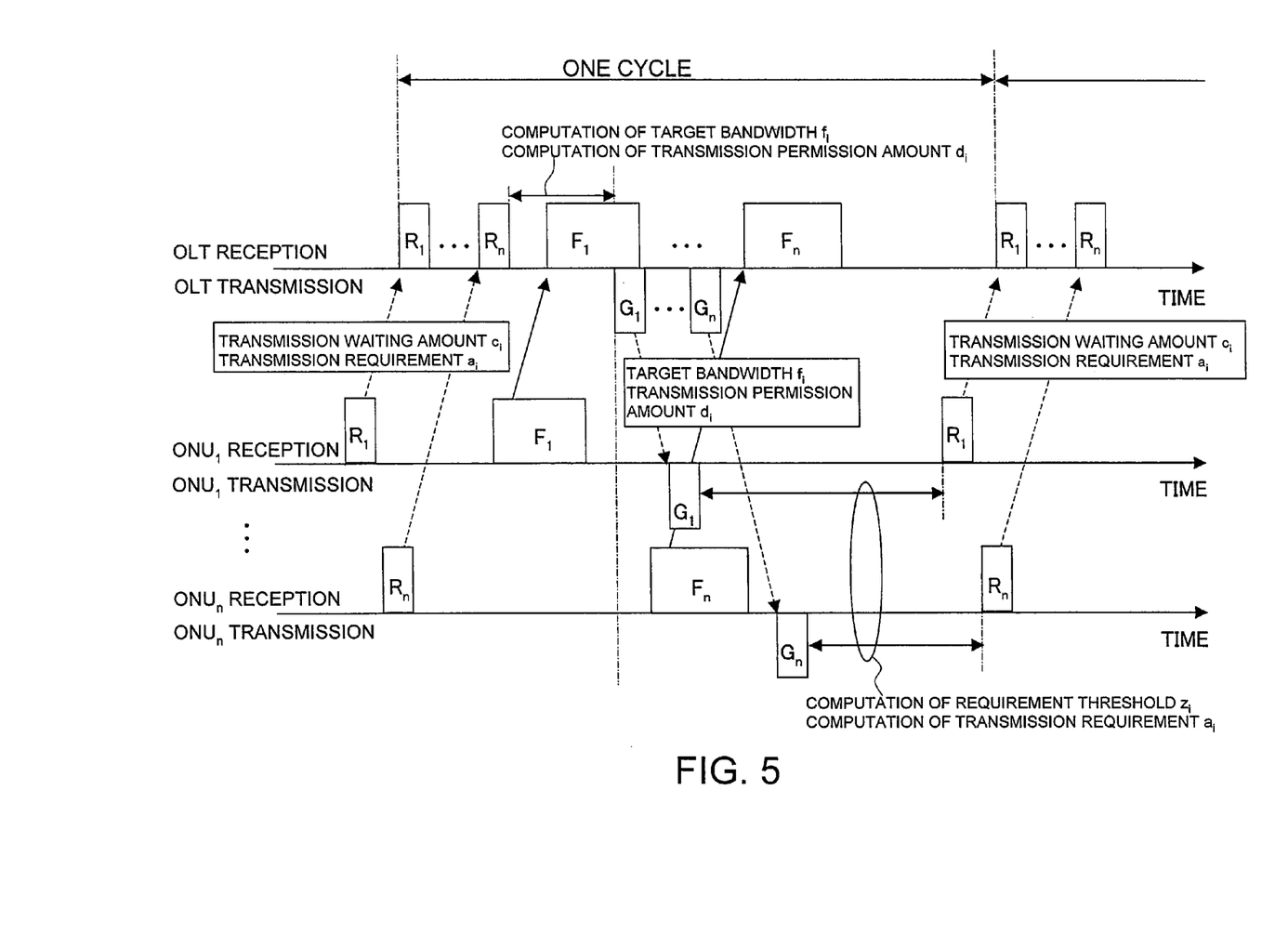
FIG. 5 is a sequence diagram illustrating an example of a bandwidth allocation method according to a second embodiment of the disclosure.

FIG. 5 is a sequence diagram illustrating an example of a bandwidth allocation method which is performed by a passive optical network system according to a second embodiment of the disclosure. The second embodiment includes a first step, a second step, and a third step in order, and is characterized in that the ONU calculates the requirement threshold $z_i$ based on the time average allocated bandwidth obtained from the allocated bandwidths of the past predetermined cycles. The point which is different from that of the first embodiment will specifically be described below.

First, each $ONU_i$ calculates and stores each time average allocated bandwidth. Each of the $ONU_1$ to $ONU_n$, describes a transmission waiting amount $c_i$ in the report frame and notifies the OLT of the transmission waiting amount $c_i$ in the timing of which the OLT notifies. The OLT calculates a target bandwidth $f_i$ based on the transmission waiting amount $c_i$ of each of the $ONU_1$ to $ONU_n$. The OLT describes the calculated target bandwidth $f_i$ in the gate frames $G_1$ to $G_n$ and notifies the $ONU_i$ of the calculated target bandwidth $f_i$.

In the first step, each $ONU_i$ obtains the time average allocated bandwidth from the allocated bandwidths to the $ONU_i$ of the past predetermined cycles, and then calculates the requirement threshold $z_i$ of the $ONU_i$ based on a difference between the time average allocated bandwidth and the target bandwidth $f_i$ determined in the $ONU_i$ similarly to the method for computing the requirement threshold $z_i$ in the first embodiment. Each $ONU_i$ calculates the data amount, which is up to a data separation that is less or equal to the calculated requirement threshold $z_i$ and in which the maximum data amount can be transmitted, as the transmission requirement $a_i$, and describes the transmission requirement $a_i$ in the report frame, and notifies the OLT of the transmission requirement $a_i$.

At this point, preferably each $ONU_i$ updates the requirement threshold $z_i$ to the calculated value based on the set period. For example, similarly to the first embodiment, preferably the setting is performed based on the relationship between the update period of the requirement threshold $z_i$ and the bandwidth convergence speed.

In the second step, the OLT calculates the transmission permission amount $d_i$ in order to permit the transmission of the data amount corresponding to the transmission requirement $a_i$ of which the OLT is notified, and notifies the corresponding $ONU_i$ of the transmission permission amount $d_i$.

In the third step, the corresponding $ONU_i$ transmits to the OLT the data $F_i$ having the data amount corresponding to the transmission permission amount $d_i$ of which the corresponding $ONU_i$ is notified.

Therefore, the time average allocated bandwidth can converge quickly on the target bandwidth $f_i$ by adopting the bandwidth allocation method of the second embodiment and the passive optical network system in which the bandwidth allocation method can be performed. The way of convergence can be controlled by adjusting the parameter for computing the requirement threshold $z_i$. Further, the $ONU_i$ autonomously calculates and updates the requirement threshold $z_i$, so that the whole processing load can be reduced.

What is claimed is:

1. A bandwidth allocation method for dynamically allocating a communication bandwidth from each of a plurality of optical subscriber units to an optical line terminal in a passive optical network in which the optical line terminal and the plurality of optical subscriber units are connected through an optical transmission line, the bandwidth allocation method comprising:

a step in which the optical line terminal obtains a time average allocated bandwidth from allocated bandwidths of past predetermined number of cycles for each of the optical subscriber units, calculates a requirement threshold for each of the optical subscriber units based on a difference between the time average allocated bandwidth for each of the optical subscriber units and a target bandwidth determined for each of the optical subscriber units, and notifies a corresponding optical subscriber unit of the requirement threshold;

a step in which the corresponding optical subscriber unit notifies the optical line terminal of a data amount, corresponding to data amount including data sections up to a section which makes a transmission amount maximum in a range equal or less than the notified requirement threshold as a transmission requirement;

a step in which the optical line terminal notifies the corresponding optical subscriber unit of a transmission permission amount in order to permit transmission of a data amount corresponding to the notified transmission requirement; and a step in which the corresponding optical subscriber unit transmits the data amount corresponding to the transmission permission amount.

2. The bandwidth allocation method according to claim 1, wherein a sum of a proportional calculation result of the difference, a time integration calculation result of the difference, and a time derivation calculation result of the difference is set to a PID computation amount, a threshold control amount is calculated based on the PID computation amount, and the requirement threshold of the corresponding optical subscriber unit is calculated based on the threshold control amount.

3. The bandwidth allocation method according to claim 2, wherein the threshold control amount is set to zero for the negative PID computation amount.

4. The bandwidth allocation method according to claim 3, wherein the requirement threshold is calculated as a value identical to the threshold control amount.

5. The bandwidth allocation method according to claim 3, wherein a predetermined minimum allocation amount is added to the threshold control amount to calculate the requirement threshold.

6. The bandwidth allocation method according to claim 2, wherein a predetermined value is added to the PID computation amount to calculate the threshold control amount.

7. The bandwidth allocation method according to claim 6, wherein the requirement threshold is calculated as a value identical to the threshold control amount.

8. The bandwidth allocation method according to claim 6, wherein a predetermined minimum allocation amount is added to the threshold control amount to calculate the requirement threshold.

9. The bandwidth allocation method according to claim 2, wherein a minimum value of the PID computation amount is set to a minimum PID computation amount in the plurality of optical subscriber units, a difference between the PID computation amount of the corresponding optical subscriber unit and the minimum PID computation amount is calculated as a PID difference, a total of the PID differences for the plurality of optical subscriber units is calculated as a PID difference total, a value obtained by the PID difference of the corresponding optical subscriber unit divided by the PID difference total is calculated as a PID difference ratio, and the threshold control amount is calculated based on the PID difference ratio.

10. The bandwidth allocation method according to claim 9, wherein the requirement threshold is calculated as a value identical to the threshold control amount.

11. The bandwidth allocation method according to claim 9, wherein a predetermined minimum allocation amount is added to the threshold control amount to calculate the requirement threshold.

12. The bandwidth allocation method according to claim 2, wherein the requirement threshold is calculated as a value identical to the threshold control amount.

13. The bandwidth allocation method according to claim 2, wherein a predetermined minimum allocation amount is added to the threshold control amount to calculate the requirement threshold.

14. The bandwidth allocation method according to claim 1, wherein the requirement threshold is updated based on a set period.

15. A passive optical network system in which an optical line terminal and a plurality of optical subscriber units are connected through an optical transmission line to dynamically allocate a communication bandwidth from each of the plurality of optical subscriber units to the optical line terminal, wherein the optical line terminal obtains a time average allocated bandwidth from allocated bandwidths of past predetermined cycles for each of the optical subscriber units, calculates a requirement threshold in each of the optical subscriber units based on a difference between the time average allocated bandwidth for each of the optical subscriber units and a target bandwidth determined for each of the optical subscriber units, and notifies a corresponding optical subscriber unit of the calculated requirement threshold;

the corresponding optical subscriber unit notifies the optical line terminal of a data amount corresponding to data amount including data sections up to a section which makes a transmission amount maximum in a range equal or less than the notified requirement threshold as a transmission requirement;

the optical line terminal notifies the corresponding optical subscriber unit of a transmission permission amount in order to permit transmission of a data amount corresponding to the notified transmission requirement ; and the corresponding optical subscriber unit transmits the data amount corresponding to the transmission permission amount.

16. A bandwidth allocation method for dynamically allocating a communication bandwidth from each of a plurality of optical subscriber units to an optical line terminal in a passive optical network in which the optical line terminal and the plurality of optical subscriber units are connected through an optical transmission line, the bandwidth allocation method comprising:

a step in which each of the optical subscriber units obtains a time average allocated bandwidth from allocated bandwidths to the optical subscriber unit for past predetermined number of cycles, calculates a requirement threshold for the optical subscriber unit based on a difference between the time average allocated bandwidth and a target bandwidth determined in the optical subscriber units, and notifies the optical line terminal of a data amount corresponding to data amount including data sections up to a section which makes a transmission amount maximum in a range equal or less than the calculated requirement threshold as a transmission requirement;

a step in which the optical line terminal notifies the corresponding optical subscriber unit of a transmission permission amount in order to permit transmission of a data amount corresponding to the notified transmission requirement ; and a step in which the corresponding optical subscriber unit transmits the data amount corresponding to the transmission permission amount to the optical line terminal.

17. The bandwidth allocation method according to claim 16, wherein the optical line terminal calculates a target bandwidth for each of the optical subscriber units according to communication states of all the optical subscriber units connected to the optical line terminal, and notifies each of the optical subscriber units of the target bandwidth.

18. The bandwidth allocation method according to claim 16, wherein a sum of a proportional calculation result of the difference, a time integration calculation result of the difference, and a time derivation calculation result of the difference is set to a PID computation amount, a threshold control amount is calculated based on the PID computation amount, and the requirement threshold of the corresponding optical subscriber unit is calculated based on the threshold control amount.

19. The bandwidth allocation method according to claim 18, wherein the threshold control amount is set to zero for the negative PID computation amount.

20. The bandwidth allocation method according to claim 19, wherein the requirement threshold is calculated as a value identical to the threshold control amount.

21. The bandwidth allocation method according to claim 19, wherein a predetermined minimum allocation amount is added to the threshold control amount to calculate the requirement threshold.

22. The bandwidth allocation method according to claim 18, wherein a predetermined value is added to the PID computation amount to calculate the threshold control amount.

23. The bandwidth allocation method according to claim 22, wherein the requirement threshold is calculated as a value identical to the threshold control amount.

24. The bandwidth allocation method according to claim 22, wherein a predetermined minimum allocation amount is added to the threshold control amount to calculate the requirement threshold.

25. The bandwidth allocation method according to claim 18, wherein the requirement threshold is calculated as a value identical to the threshold control amount.

26. The bandwidth allocation method according to claim 18, wherein a predetermined minimum allocation amount is added to the threshold control amount to calculate the requirement threshold.

27. The bandwidth allocation method according to claim 16, wherein the requirement threshold is updated based on a set period.

28. A passive optical network system in which an optical line terminal and a plurality of optical subscriber units are connected through an optical transmission line to dynamically allocate a communication bandwidth from each of the plurality of optical subscriber units to the optical line terminal, wherein each of the optical subscriber units obtains a time average allocated bandwidth from allocated bandwidths of past predetermined number of cycles for each of the optical subscriber units, and calculates a requirement threshold for each of the optical subscriber units based on a difference between the time average allocated bandwidth and a target bandwidth determined for each of the optical subscriber units;

the corresponding optical subscriber unit notifies the optical line terminal of a data amount, corresponding to data amount including data sections up to a section which makes a transmission amount maximum in a range equal or less than the calculated requirement threshold as a transmission requirement;

the optical line terminal notifies the corresponding optical subscriber unit of a transmission permission amount in order to permit transmission of a data amount corresponding to the notified transmission requirement ; and the corresponding optical subscriber unit transmits the data amount corresponding to the transmission permission amount.

* * * * *